No. 833,213. PATENTED OCT. 16, 1906.
T. HOWARD.
DISK PLOW OR HARROW.
APPLICATION FILED APR. 24, 1906.
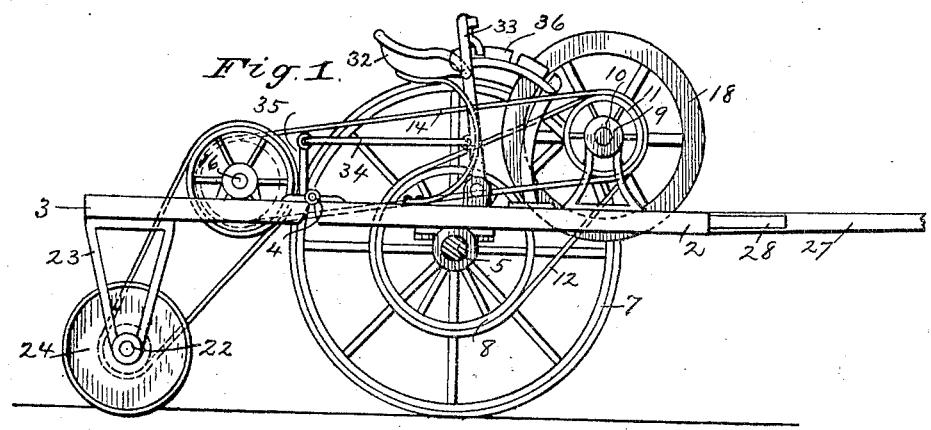
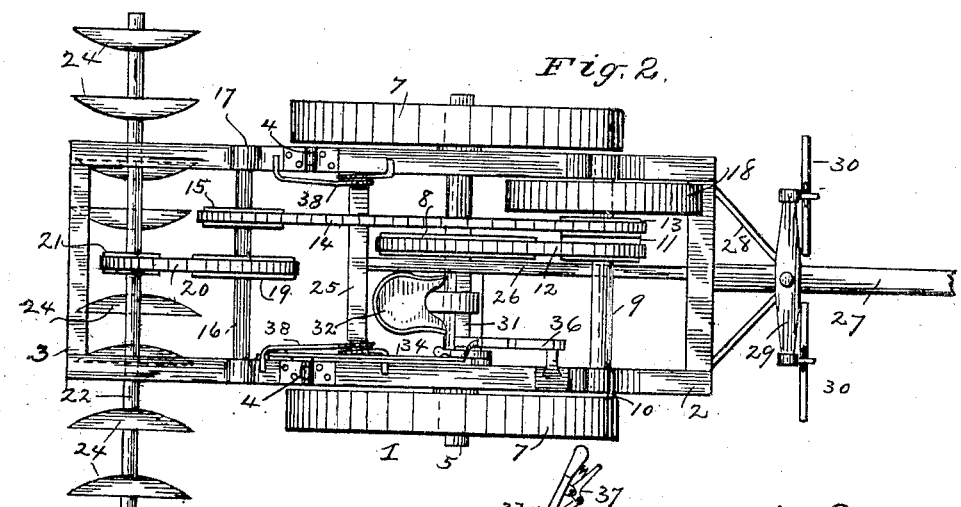
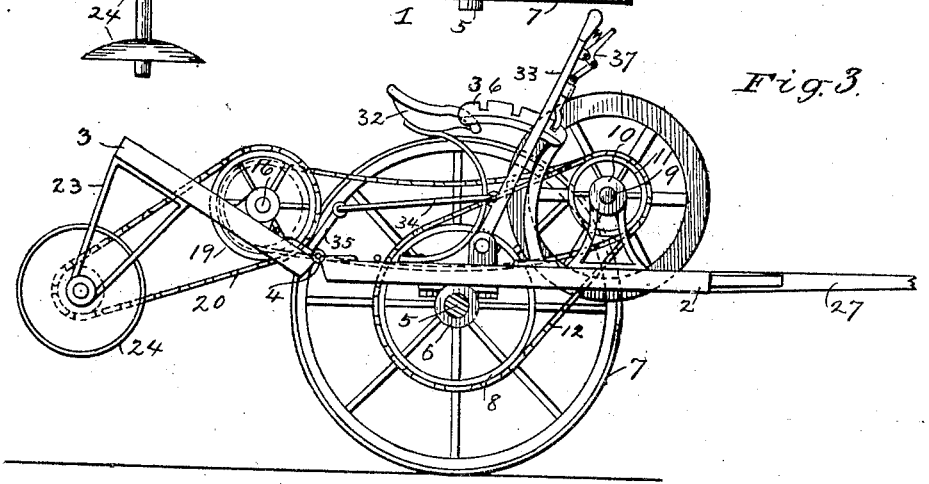
Witnesses
W. Rees Edelen.
John S. Towers
Inventor
Thomas Howard
By
Shepherd & Parker
Attorneys

UNITED STATES PATENT OFFICE.

THOMAS HOWARD, OF PHILPOT, KENTUCKY.

DISK PLOW OR HARROW.

No. 833,213.      Specification of Letters Patent.      Patented Oct. 16, 1906.

Application filed April 24, 1906. Serial No. 313,445.

*To all whom it may concern:*

Be it known that I, THOMAS HOWARD, a citizen of the United States, residing at Philpot, in the county of Daviess and State of Kentucky, have invented certain new and useful Improvements in Disk Plows or Harrows, of which the following is a specification.

This invention relates to new and useful improvements in disk plows or harrows; and it especially contemplates a plow or harrow designed to reduce the draft upon the animal.

In connection with the above general object the invention comprises a plurality of dish-shaped disks of conventional form, which are positively rotated by gearing driven from the axle and are not dependent for their movement by frictional contact with the ground, as is customary in the present development of the art.

Novel means are provided for generating momentum to maintain the power transmitted to the disks from the axle.

Novel means are provided for allowing the disks a limited vertical movement to compensate for ground inequalities or obstructions.

Finally, toward the attainment of the general object of reducing the draft the several parts are so arranged as to effectually counterbalance one another.

The detailed construction will appear in the course of the following description, reference being had to the accompanying drawings, forming a part of this specification, like numerals designating like parts throughout the several views, wherein—

Figure 1 is a side elevation of a disk plow or harrow constructed in accordance with my invention. Fig. 2 is a top plan view thereof. Fig. 3 is a side elevation, the harrow or plow disks and the suspension-frame therefor being elevated.

In the practical embodiment of my invention I employ a frame 1, comprising a front section 2 and a rear section 3. These sections are of substantially U shape and are of the same width and have hinged connections at the confronting ends of the adjacent side arms, as at 4, thereby coacting with one another to form an elongated rectangular frame for supporting the component parts of the apparatus.

A shaft 5 is journaled transversely of the section 2 in depending bearing 6. The shaft 5 carries at its end traction-wheels 7 and at an approximately central point a drive-pulley 8. A second shaft 9 is mounted in bearings 10 above the section 2 and is disposed in parallel relation to the shaft 5. The shaft 9 is provided with a pulley 11 in alinement with the pulley 8 and driven therefrom by a belt 12. A second pulley 13 is mounted upon the shaft 9 and transmits power through a belt 14 to a pulley 15, mounted upon a shaft 16, journaled transversely above the frame 3 in bearings 17 provided therefor. The shaft 9 is also provided with a fly-wheel 18, by which the momentum of the power generated by the traction-wheel 7 and transmitted through the gearing above described is maintained. The shaft 16 is provided with a drive-pulley 19, over which is trained a belt 20, which drives a pulley 21, carried by a horizontal shaft 22, journaled in hangers 23, depending from the section 3. A series of plow or harrow disks 24 of conventional form are mounted upon the shafts 22 in opposed relation on each side thereof.

A beam 25 extends transversely across the rear portion of the section 1 and has connection at an approximately central point with a longitudinal brace 26 connected at its front end with the section 2. A tongue or pole 27 extends forwardly of the section 2 and is braced by diagonal stay-rods 28 on each side thereof. Said tongue is provided with the usual draft-equalizer 29, carrying swingletrees 30.

A short-length cross-beam 31 extends between the brace 26 and one of the side bars of the section 2 above the shaft 6. Supported upon the beam 31 is a seat 32 of conventional form. Mounted adjacent to the seat 32 is a fulcrumed lever 33, which has pivotal connection adjacent its lower end with a link 35, in turn fulcrumed to a vertical post 35, carried at one side of the section 2. A rack-sector 36 is supported adjacent to the lever 33 from the section 2 of the frame, and said lever is provided with a pawl or catch 37 for engagement with the teeth of said rack-sector.

Torsional springs 38 are carried on each side of the beam 25 and with their free ends bear against the respective sections 2 and 3. Said springs serve to maintain the section 3 in its lowermost position and to compensate for its yielding action in passing the irregularities of the ground-surface.

In operation power is transmitted through the gearing described from the shaft 5 to the shaft 22, which rotates the disks 24 about twice as fast as they would normally be rotated if their movement depended upon frictional contact with the ground. The provision of the power-transmission elements, together with the arrangement of the shaft 22 in parallel relation with the shaft 5, reduces the draft of the apparatus and causes the work to be more effectively performed, and the draft is further minimized by the provision of the fly-wheel 18 forwardly of the shaft 5, which serves to counterbalance the structure as well as to maintain a requisite momentum. The section 3 yields upon its hinges 4 to compensate for inequalities or irregularities in the ground to be plowed. In passing an obstruction the section 3, together with the parts suspended therefrom, is lifted upon its hinges by the proper movement of the lever 33 to actuate the connecting elements, and said lever may be locked in any desired position by the pawl 37 engaging the rack-sector 36. The springs 38 serve to maintain the section 33 in its lowermost position in order that the disks 24 may always be disposed with a portion of their surface within the ground.

It is to be understood that the gearing herein described is purely arbitrary and any other form of gearing that will impart the requisite speed to the disks 24 may be employed as desired.

Having fully described my invention, I claim—

In a plow of the type set forth, a wheel-frame of rectangular proportions as an entirety and formed in two substantially U-shaped front and rear sections, pivoted together horizontally adjacent the ends of their confronting arms, a transverse shaft carried by said front section between the two ends thereof, traction-wheels mounted upon said shaft, a revolving disk shaft carried adjacent the rear end of said rear section, disk plows mounted upon said last-named shaft, a train of gearing interposed between said first-named shaft and said disk shaft, means for raising and lowering said rear section upon its pivot and resilient elements carried upon the ends of said front section and bearing against the ends of said rear section to restrict and brake the same in its upward pivotal movement.

In testimony whereof I affix my signature in presence of two witnesses.

THOMAS HOWARD.

Witnesses:
PEARLE DINKELSPEEL,
MAMIE KELLY.